United States Patent
Zickert

[11] Patent Number: 5,431,818
[45] Date of Patent: Jul. 11, 1995

[54] TRANSPORTING ELEMENT OF A RECIPROCABLE SCRAPER FOR MOVING SLUDGE IN SETTLING BASINS AND SIMILAR OBJECTS AT WATER PURIFICATION PLANTS

[75] Inventor: Klaus D. Zickert, Kungsbacka, Sweden

[73] Assignee: K Z Handels Aktiebolag, Kungsbacka, Sweden

[21] Appl. No.: 298,356

[22] Filed: Aug. 29, 1994

Related U.S. Application Data

[63] Continuation of Ser. No. 152,079, Nov. 9, 1993, abandoned, which is a continuation of Ser. No. 920,096, Jul. 24, 1992, abandoned.

[51] Int. Cl.$^6$ .............................................. B01D 21/18
[52] U.S. Cl. ................... 210/527; 210/532.1; 210/541
[58] Field of Search ............... 210/523, 525, 526, 527, 210/532.1, 541

[56] References Cited

U.S. PATENT DOCUMENTS

| | | | |
|---|---|---|---|
| 1,837,994 | 12/1931 | Preston | 198/747 |
| 2,006,825 | 7/1935 | Downes | 210/527 |
| 2,768,749 | 10/1956 | Easterday | 210/527 |
| 2,866,557 | 12/1958 | Easterday | 210/527 |
| 3,774,770 | 11/1973 | Sparham et al. | 210/527 |
| 3,797,664 | 3/1974 | Pentz et al. | 210/527 |
| 4,090,966 | 5/1978 | Clendenen | 210/143 |

FOREIGN PATENT DOCUMENTS

| | | |
|---|---|---|
| 936980 | 12/1955 | Germany . |
| 55-84506 | 6/1980 | Japan . |
| 454140 | 4/1938 | Sweden . |
| 422191 | 2/1982 | Sweden . |
| 423968 | 6/1982 | Sweden . |
| 1504518 | 3/1978 | United Kingdom . |

*Primary Examiner*—Christopher Upton
*Attorney, Agent, or Firm*—Brumbaugh, Graves, Donohue & Raymond

[57] ABSTRACT

The present invention relates to a transporting element of a reciprocable scraper for the movement of sludge in settling basins and similar objects at water purification plants, whereby the transporting element (8) consists of a body, which in cross-section shows a downwardly facing surface (9), a substantially oblique, convex surface (10), and a substantially vertical concave surface (11), whereby the concave surface (11) is directed in the forwarding, transporting direction. (FIG. 2)

1 Claim, 3 Drawing Sheets

TRANSPORTING ELEMENT OF A RECIPROCABLE SCRAPER FOR MOVING SLUDGE IN SETTLING BASINS AND SIMILAR OBJECTS AT WATER PURIFICATION PLANTS

This application is a continuation of application Ser. No. 08/152,079, filed on Nov. 9, 1993, which is a continuation of application Ser. No. 07/920096, filed on Jul. 24, 1992, both abandoned.

TECHNICAL FIELD

The present invention relates to a transporting element at reciprocable scrapers for moving sludge in settling basins and similar objects at water purification plants.

BACKGROUND OF THE INVENTION

Hitherto chain scrapers have been used in many settling basins in order to remove the sludge which precipitate to the bottom of the basin. These chain scrapers consist of one or more scraping blades extending across the bottom of the basin and which are dragged forward by means of continuously going chains in a pater noster conveyer movement. These constructions have certain advantages by providing a good cleaning result and have moreover good functionality as long as the construction is in good order. However, in spite of its genuine basic construction serious casualties often occur. These depend on the heavy corrosion which all components, including the chains, are subject to. In the settling basins of the water purification plants the environment is very corrosive due to the acid aluminium and iron salts used in the chemical precipitation step present in the purification plants, which salts are used inter alia for the precipitation of phosphorous.

It has also been proposed a traverse which is driven above the water surface of the basin. A vertically rising scraper is mounted onto arms on the traverse. A drawback of this construction is that it is complicated to use in basins present, which quite often are provided with different equipment above the basin, such as walking bridges, and other equipment providing a hindrance. Further the settling is disturbed by the vertical devices holding the scraper.

Further, it has been proposed wire pulled scrapers or scraping devices where one or more wires pulls a carriage or sleigh holding scrapers on or close to the .bottom of the basin in a to and fro going movement. (SE-B-423,968; U.S. Pat. No. 2,866,557;4 U.S. Pat. No. 2,768,749; U.S. Pat. No. 4,090,966; GB-A-1,504,518). The technique is an improvement over prior art chain driven scrapers by a considerably more simple, lighter and cheaper construction. However, the system means that different devices have to be used in order to turn the scraping blade and to control this turning, from a vertical to a horizontal position and vice verse, during the reciprocable movement carried out by the wire/-s. The scraping blades, which consist of metal blades being edge mounted in the transporting direction and most often being provided with a rubber edge strip, extend across the width of the basin, perpendicular to the transporting direction. At the reciprocable movement of the scraping blades, sludge is, however, stirred up, so called sludge escape, due to the formation of turbulence behind the blades and thus a maximum efficiency cannot be reached. The load on the devices further leads to that they have to be manufactured in metal, and in order to prevent corrosion from eating the devices too fast they have to be manufactured in more acid resistant materials which increases costs.

It is previously known from SE-C-454,140 a device in settling basins and similar objects, for moving sludge and sediment gathered from the bottom of the basin, whereby a transporting device is arranged to be moved to and fro close to the bottom of the basin, whereby sludge and sediment is moved at the forward movement to one end of the basin, whereby the transporter consists of a mat comprising means having a wedge formed, triangular cross-section, which means are arranged essentially perpendicular to the moving direction of the transporter and the point of the wedge is directed in the returning direction and the wedge base of said means being directed in the forwarding direction.

DE-C-936,980 discloses a transporting element of a scraper wherein one embodiment shows a triangular cross-section, and one embodiment shows wingshaped cross-section, with a plane bottom surface, a substantially oblique convex surface, and a substantially vertical, broken surface, which latter is the transporting surface of sludge of the element.

The triangular form, a perpendicular triangle, has per se advantages by creating a very low resistance during the returning movement in the water. However, it has turned out that a certain sludge flight exists, particularly at the forward movement at the treatment of light sludge, when the sludge is pressed up along the base of the wedge, but also during the return movement when the vortices behind the base of the wedge become unfavourable.

Thus there is a demand for other types of transporting means for transporting sludge and sediment in settling basins. Hereby, one wants to increase the efficiency by minimizing sludge flight.

One object of the present invention is to obtain a device meeting these requirements.

DESCRIPTION OF THE PRESENT INVENTION

It has now surprisingly turned out possible to be able to meet these requirements by means of the present invention, which is characterized in that the transporting element consists of a body which in cross-section shows a downwardly facing bottom surface, a substantially oblique, convex surface, and a substantially vertical, concave surface, whereby the concave surface is facing the forward going, transporting direction at transport of sludge. Thus the transporting element can be arranged to a device in accordance with SE-C-454,140 or other similar equipment.

By means of the present invention a minimal turbulence is created around the scraping devices and the whole mat is in principle a transporting unit. At the forward movement the sludge will rotate forwardly by means of the concave surface which reduces sludge flight and binds the sludge together. At the return movement the water will slide along the convex surface and descend behind the transporting element and thereby prevent sludge flight, which previously have had a tendency to occur using the plane wedge base according to the prior art. At a device where the present transporting element is present it can be given such a length which is closely adapted to the form and length of the basin intended. Further the stroke length of the reciprocable movement can be adapted within broad limits, but preferably it can be made very short which means that a simple hydraulic or pneumatic technique can be used.

BRIEF DESCRIPTION OF THE DRAWINGS

The invention will be described more in detail in the following with reference to the accompanying drawing, wherein.

Figure 1:
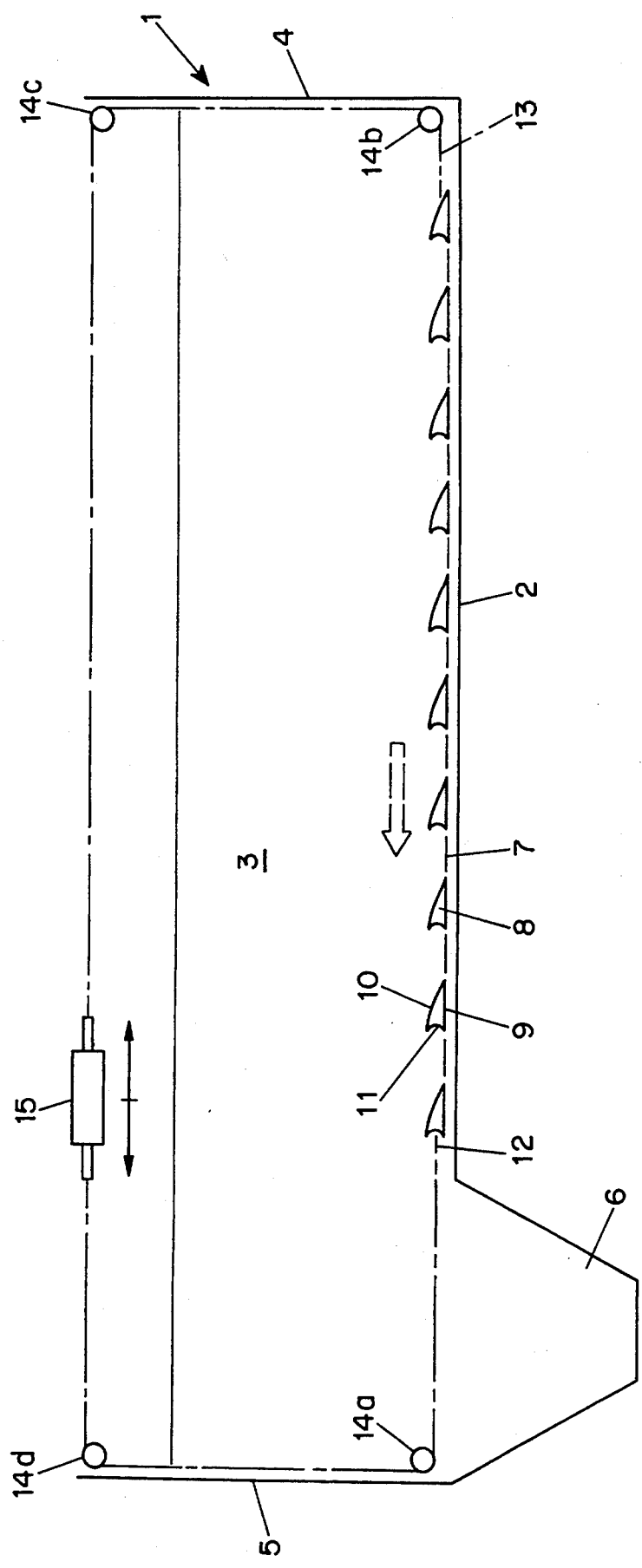
FIG. 1 shows a side view of a settling basin having a device comprising a transport element according to the present invention.

1 denotes a longitudinal extending settling basin. The basin 1 is limited by a bottom 2, two long sides 3, a rear short side 4 and a front short side 5. In the forward part of the basin a sludge hopper 6 is arranged.

Figure 2A:
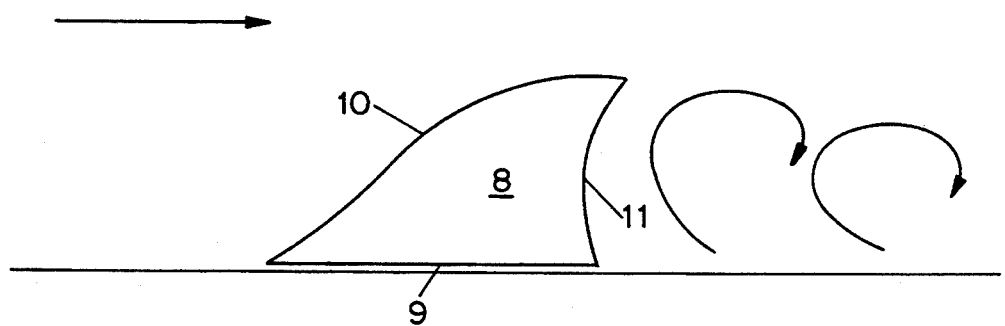
FIG. 2 shows a transport element of the invention seen in cross-section.
Figure 2B:
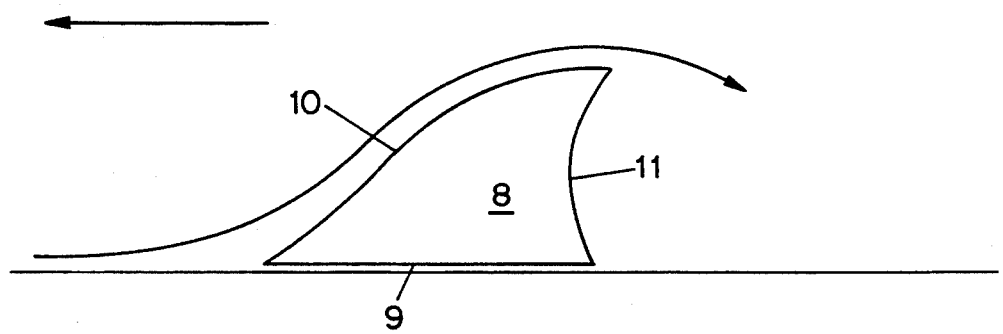

7 denotes a net of reinforced polymer, mesh size 150 ram, which carries a number of transporting elements 8, which are attached to the net 7 and thereby is placed perpendicular to the longitudinal direction of the basin 1. As evident from FIG. 2 the transporting element 8 a cross-section having a plane bottom surface 9, a substantially oblique, convex surface 10, and a substantially vertical, concave surface 11. In the embodiment of FIG. 2 the relationship between the projected lengths of the areas, in the order mentioned, are 1.6: 1.8: 1. FIG. 2a shows the movement of the water/sludge at a forwarding, transporting movement with the arrows indicated in front of the concave surface, while FIG. 2b shows the movement of the water at a returning movement with the arrow above its convex surface.

Figure 3A:
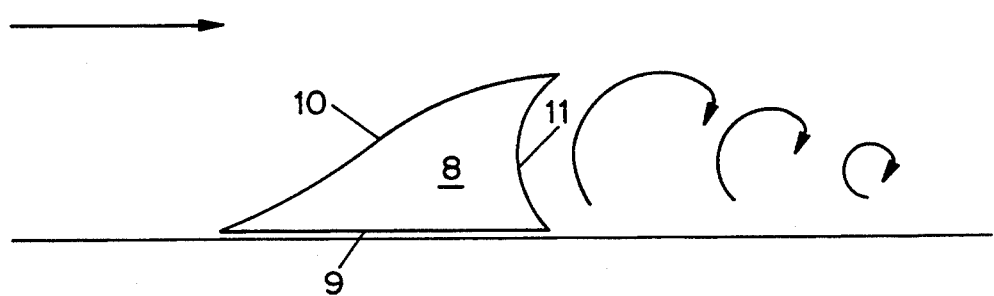
FIG. 3 shows a further embodiment of the invention seen in cross-section.
Figure 3B:
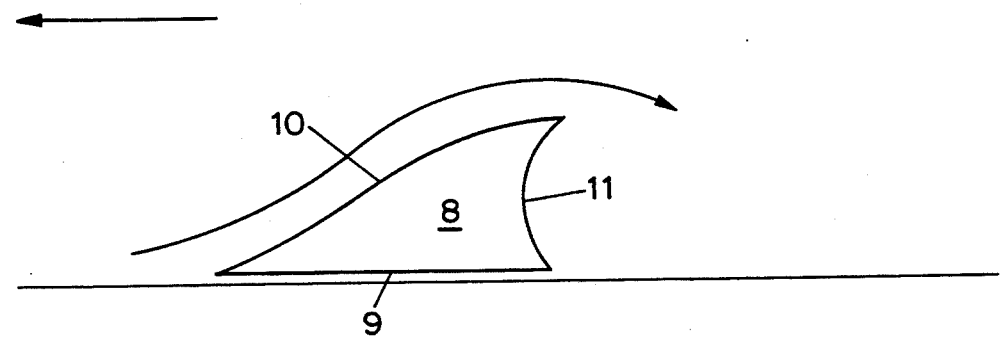

In FIG. 3 a further embodiment is shown, wherein the relationship is 2.1:2.5:1, i.e. a lower profile. In this embodiment the concave surface 11 shows a somewhat smaller radius which increases the arcuate form of the concave surface in cross-section.

The transporting element 8 can be massive or hollow and manufactured of any suitable material, such as wood (pressure impregnated), polymer, iron plate. I.e. need and cost dependent.

The transporting element 8 has turned out to be excellent at all types of sludge, such as primary sludge, biological sludge, chemically precipitated sludge as well as a light sludge. This means types of sludges and sediment both from sewage water purification plants and tap water purification plants.

The points of the elements 8 are directed towards the rear short side 4 of the basin, and its concave surface 11 is directed towards the front short side 5.

Along the centre of the net 7 in the longitudinal direction there is a pulling band 12 arranged made of stainless steel. The band 12 can be exchanged to a less flexible rod, if so desired. The band or pulling rod 12 are at their ends connected to a wire 13, which via four pulley wheels 14a, b, c, d: two at each end of the basin 1, leads the wire 13 to a driving unit 15, which pulls the wire alternately in the one or the other direction. The driving unit 15 can hereby be a gear motor provided with a cable drum or a hydraulic piston system with a reciprocable movement at which ends the wire is attached. Partly by placing the pulley wheels 14a and b at a level shortly above the bottom 2 of the basin, partly by stretching the wire 13, partly by, in this case, the density of the elements 8, the net 7 with the elements 8 will only quite readily touch the bottom 2, which means a minimal wearing and a minimum of driving resistance. By applying so called gliding plastic on the underside of the net on exposed areas such as the pulling rod 12, no wearing of the unit takes place.

If the basin has a large width several pulling wires 13, as well as several pulling rods 12 be arranged, if so needed for an even run.

Figure 4A:
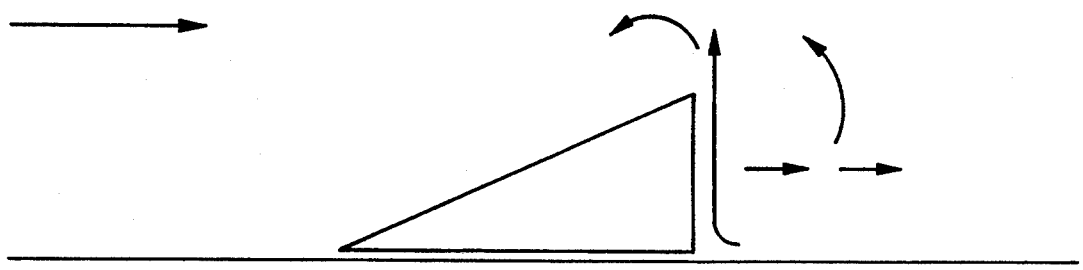
FIG. 4 shows an embodiment of a transport element of SE-C454,140 seen in cross-section.
Figure 4B:
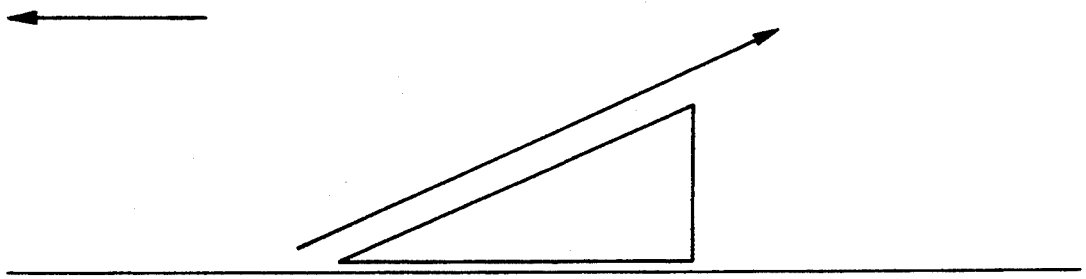

FIG. 4 shows a wedge formed element according to SE-C-454,140 where the movement of the water/sludge has been shown with arrows in a corresponding way as has been made at the transporting element above.

The device according to FIG. 1 works with a stroke length of the reciprocable movement of 40 to 50 cm. Hereby, the stroke length can be made shorter by using a series of convex-concave elements connected to each other.

The net 7 can in one embodiment be exchanged to flexible, nonelastic bands to which elements 8 are attached. Hereby the bands 16 are connected in each end to a pulling rod. The bands may likewise be exchanged to non-elastic wires. The pulling rod is in turn connected to the pulling wire/-s 13 for driving the device.

At tests carried out it has turned out that a device of the present invention has the same capacity as a chain scraper, which, as stated above, hitherto, has been regarded to be the best sludge transporter in settling basins, and thereby superior to the so called wire scrapers of above. It has also turned out that the energy consumption at running is extremely small, as well as the wearing.

The present embodiment of FIG. 2 (I) has been compared with an embodiment of SE-C-454,140 (triangular cross-section=FIG. 4) (II), and an embodiment of DE-C-936,980 (broken front surface) (III) of the prior art, all profiles having a flat bottom surface. In a testing basin the water depth was held at 1 meter. On its bottom a coagulated v flocculated sludge layer having a depth of 0.2 meter was present. The profiles have been given two directed movements, one to and one fro going movement. The returning movement is carried out at a speed of 12 m/min, and the forwarding movement with a speed of 3 m/min. Registration of the sight depth has been made by using a white circular disc lowered into the water, whereby registration of the depth when the disc is not longer viewable is made, as well as of the amount of sludge transported. The results obtained are shown in the table below.

TABLE

| Profile | Sight depth (m) while running | Amount of flocs transported |
|---|---|---|
| I | 0.75 | about 75% |
| II | 0.65 | about 55% |
| III | 0.60 | about 60% |

The results show that the present profile disturbs the sediment to a less extent than the profiles of the prior art, and that a higher transporting capacity.

In the embodiment above, the mat has been provided with a pulling wire 13, which works at both ends. In another embodiment the returning pulling wire 13 may be eliminated and be replaced with spring provided means which is being stretched when one pulls the wire 13 and which then returns the mat when one loosens the wire 13.

It is of importance that the mat comprises through passing openings so that liquid/sludge may pass from the underside of the mat to the upperside thereof, as otherwise sediment may built up underneath the mat.

I claim:

1. In a settling basin, a device for transporting sludge and sediment along the floor of a settling basin, the device comprising a transporting element having a three-sided cross section having a bottom planar surface, a substantially curved concave front-side surface and a substantially oblique top-side surface a portion of which is convex, and wherein the front and top surfaces each join the bottom surface at an acute angle; and means for moving the transporting element along the floor of the settling basin in both a forward direction and a reverse direction with the front-side surface of the transporting element facing in the forward direction.

* * * * *